United States Patent [19]

Schulte

[11] 3,758,073

[45] Sept. 11, 1973

[54] VALVE FOR PHYSIOLOGICAL DRAINAGE ACTUABLE BY LATERAL COMPRESSION

[76] Inventor: Rudolf R. Schulte, 5377 Overpass Rd., Santa Barbara, Calif. 93105

[22] Filed: Oct. 26, 1971

[21] Appl. No.: 192,211

[52] U.S. Cl. ............................ 251/342, 251/335 A
[51] Int. Cl. .......................................... F16k 31/58
[58] Field of Search ................... 251/342, 348, 335; 137/513.5

[56] References Cited
UNITED STATES PATENTS

| | | | |
|---|---|---|---|
| 2,964,292 | 12/1960 | Noir | 251/342 |
| 3,517,909 | 6/1970 | Santomieri | 251/342 |
| 2,731,299 | 1/1956 | Bramming | 137/513.5 X |
| 2,946,555 | 7/1960 | Cantor | 251/342 |
| 3,626,959 | 12/1971 | Santomieri | 251/342 X |
| 3,685,795 | 8/1972 | Caster | 251/342 |

FOREIGN PATENTS OR APPLICATIONS

| | | | |
|---|---|---|---|
| 1,074,939 | 2/1960 | Germany | 251/342 |
| 1,294,685 | 4/1962 | France | 251/342 |

Primary Examiner—Samuel Scott
Attorney—D. Gordon Angus and Donald D. Mon

[57] ABSTRACT

A normally-closed valve for physiological drainage which can be opened by lateral compression. A valve body defines an interior flow cavity with an inlet and outlet passage opening therein through the body. A peripheral valve seat extends continuously around the outlet passage and faces into the flow cavity, the valve body and valve seat being flexible and deformable by lateral compressive force exerted externally on the valve body. A valving member is movably disposed in the flow cavity and adapted to make a fluid-tight sealing fit with the valve seat when the valve body is undistorted, and to leave a flow passage between them when the valve body is distorted by lateral compression.

3 Claims, 7 Drawing Figures

PATENTED SEP 11 1973 3,758,073
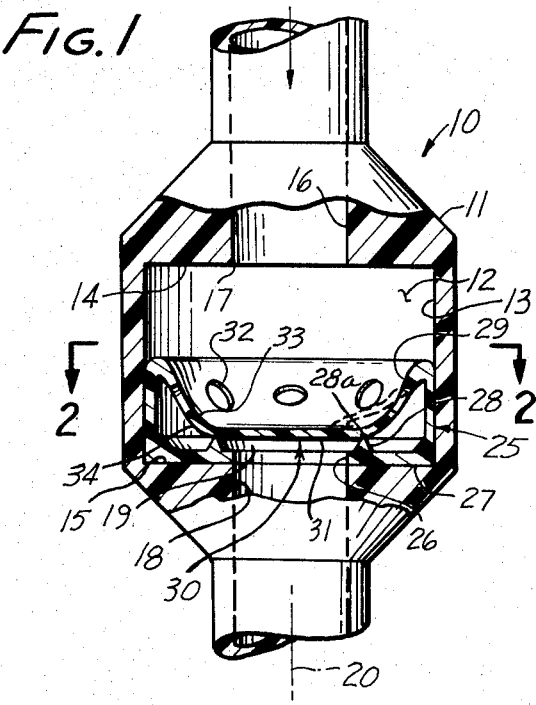
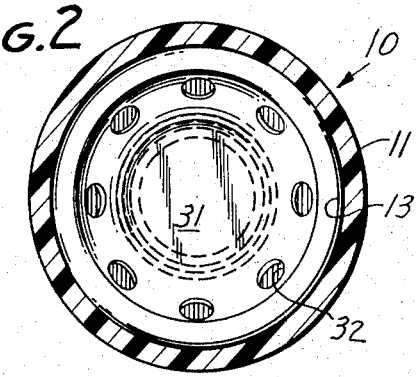
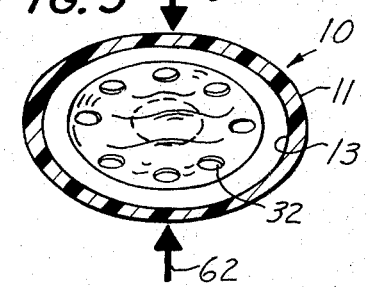
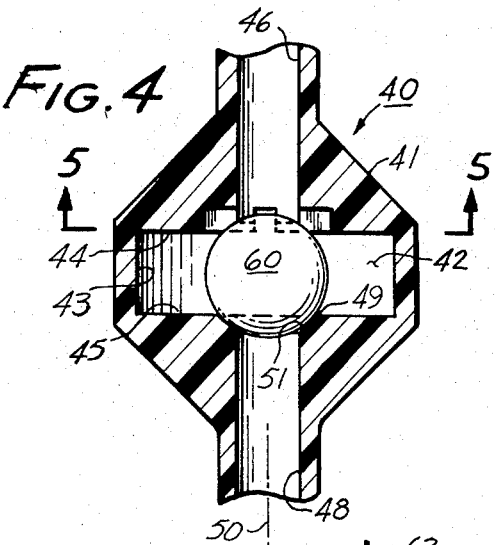
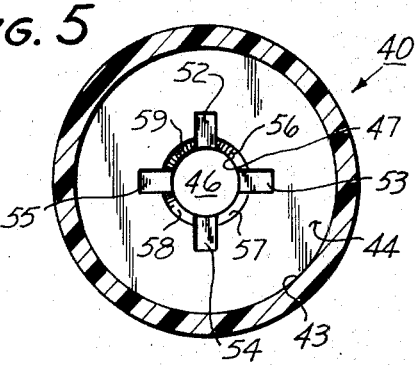
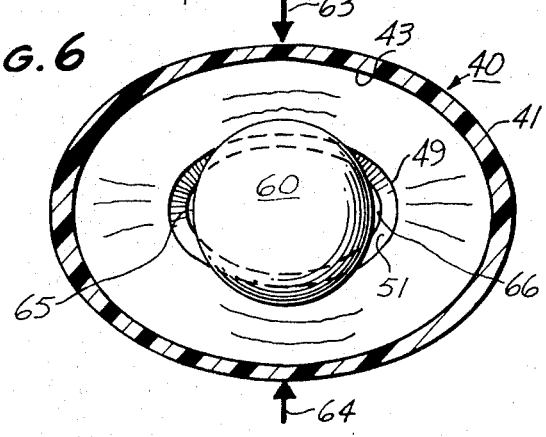
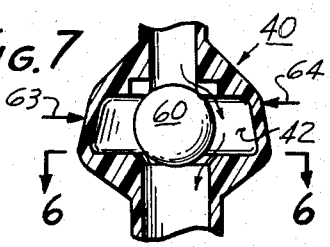
INVENTOR.
RUDOLF R. SCHULTE
BY
ATTORNEYS.

VALVE FOR PHYSIOLOGICAL DRAINAGE ACTUABLE BY LATERAL COMPRESSION

This invention relates to valves for the control of physiological drainage and in particular to one which is normally closed, but which can be opened by lateral compressive forces.

There are numerous drainage applications within the human body, for example the drainage of urine from the bladder of incontinent persons wherein a valve would be useful as an implant, but which would require the capacity to be opened by external compressive forces, such as by pressure through the skin to squeeze and to deform the body. It is an object of this invention to provide such a device in a rugged, reliable and simple form so that mal-function is extremely unlikely. Reliability and long useful life are prime requisites of implant systems.

A normally closed valve according to this invention comprises a valve body with an interior flow cavity. An inlet passage and an outlet passage pass through the body and open into the flow cavity. A peripheral valve seal extends continuously around the outlet passage and faces into the flow cavity. The valve body and valve seat are flexible and deformable by lateral compressive force exerted externally on the valve body. A valving member is movably disposed in the flow cavity. It is adapted to make a fluid-tight sealing fit with the valve seat when the valve body is undistorted, and to leave a flow passage between them when the valve body is distorted by lateral compression.

According to a preferred but optional feature of the invention, the valve member comprises a slack flexible diaphragm extending across the flow cavity and having a central imperforate region adapted to contact the valve seat and close the outlet passage, and also having a perforation there through which lies outside of said imperforate region so as fluidly to intercommunicate both faces of the diaphragm.

According to another preferred but optional feature of the invention, the valve seat comprises a ball adapted to rest against the valve seat when the body is undistorted, and to lift off the valve seat and leave a flow channel when the valve body and seat are distorted.

The above and other features of this invention will be fully understood from the following detailed description and the accompanying drawings in which:

FIG. 1 is a side view, partly in axial cross-section, of one embodiment of the invention;

FIG. 2 is a cross-section taken at line 2—2 of FIG. 1 with the valve in its undistorted condition;

FIG. 3 is a view similar to that of FIG. 2 showing the valve in its distorted condition;

FIG. 4 is an axial cross-section showing the presently preferred embodiment of the invention;

FIG. 5 is a cross-section taken at line 5—5 of FIG. 4;

FIG. 6 is a cross-section taken at line 6—6 of FIG. 7 showing the valve in its actuated, distorted condition; and FIG. 7 is an axial cross-section taken similarly to the section of FIG. 4, and showing the device in its actuated distorted condition.

A valve 10 according to the invention is shown in FIG. 1. It comprises a body 11 having an internal flow cavity 12 bounded by a peripheral wall 13 and a pair of end walls 14, 15. Inlet port 16 enters the flow cavity through end wall 14 intersecting it at a circular edge 17. An outlet port 18 enters the flow cavity through end wall 15 at an edge 19. The valve body and the ports share a common central axis 20.

A flow control member 25 is fitted in the flow cavity and bears against peripheral wall 13 and end wall 15, it has a central aperture 26 and a base 27 which bears against end wall 15 the aperture being aligned with the outlet port. A flexible valve seat 28, bears a sharp peripheral valving edge 28a that faces into the flow cavity. The valve seat and its valving edge continuously encircle the outlet port, and lie normal to axis 20 when the body is undeformed. Seat 28 and its edge 28a form a functional extension of the wall of the flow cavity. A flexible web 29 interconnects the base (and thereby the valve seat) with a diaphragm 30 (sometimes called a "valving member"), which diaphragm is slack. In its normal relaxed condition as shown in FIG. 1, its central imperforate region 31 bears against the valve seat and closes the outlet port by overlaying the valving edge. A plurality of perforations 32 lie laterally outside the imperforate region so as fluidly to intercommunicate opposite faces 33 and 34 of the diaphragm. It is more convenient to provide the diaphragm and valve seat as part of an integral flow control member, which can simply be placed in the valve body as an insert, than to form them as parts of the valve body, although this could be done instead, if preferred. In actual construction, the valve body may be made in more than two pieces, which are joined together by cement.

The valve body and the valve seat are made of flexible material so that the structure is deformable by lateral compression. If desired, the imperforate region may also be made flexible although this is not necessary to the function of the invention. The term "lateral compression" as used herein means a force having a component normal to axis 20.

The presently preferred embodiment of the invention is shown in FIG. 4, which device also may have been fabricated in a plurality of pieces and the joined to form an integral unit as in FIG. 1. Valve 40 is provided with a body 41 having a flow cavity 42 with a peripheral wall 43 and end walls 44 and 45. An inlet port 46 enters the flow cavity through end wall 44 and forms an edge 47 therewith, while an outlet port 48 enters the cavity through the body at end wall 45 forming an edge 49 in so doing. The outlet ports and the flow cavity sheare a common central axis 50.

A valve seat 51 is formed at edge 49 which is tapered for a purpose yet to be disclosed. A plurality of notches 52, 53, 54, 55 are formed in end wall 44 at edge 47 so as to form a fluid by-pass past edge 47 and permit fluid to flow past it at all times. The notches form buttresses 56, 57, 58, 59 with edges to abut valving member 60 (a ball).

The diameter of valving member 60 is such that when the valve is in its undistorted condition as shown in FIG. 4, the ball will rest against the valve seat and against the buttresses and will not rattle around. The buttresses in affect normally hold the ball seated to close the valve. The notches permit the fluid to by-pass edge 47 so as to fill the flow cavity under all circumstances.

The valve body and the valve seat are made of flexible and deformable material, while it is not necessary that the ball be made of such material. Where a flexible deformable material is called for in either embodiment, a medical grade silicone rubber is suitable because it is acceptable by tissues of the human body and is long-lived. The enclosed valving elements may be made of that material, or of any other material which is not reactive to the fluids which will be passed through the valve.

The operation of the valves will now be described, with initial reference to FIG. 1. In FIG. 1, normal flow to be controlled by the valve flows from inlet port 16 and through the flow cavity and outlet 18 in that order. When the valve is in its normal and undistorted condition, the slack formation of the diaphragm will allow it to rest upon the valve seat and close it. This situation is shown in solid line in FIG. 1 and also in FIG. 2. Should the valve be laterally squeezed as shown by arrows 61, 62 in FIG. 3, then the valve seat will be moved out of round, and also usually out of its plane. Also the valve diaphragm will be wrinkled as shown in dashed line in FIG. 1 and in perspective in FIG. 3, thereby creating a flow passage past the valve seat from the flow cavity to the outlet port. One can simply press against the body of the valve to actuate and open the same without having to have direct access to it. The valve body will be made sufficiently stiff that ordinary body movements will not cause it to be opened. Also it will ordinarily be placed in some reasonably soft region of the body wherein distortive forces sufficient to open the valve will not result from ordinary body movements.

The operation of the device of FIG. 4 is quite similar. In the undistorted condition shown in FIG. 4 the ball will rest directly upon valve seat 51 and close the valve to flow. Should flow be desired, then as illustrated above by arrows 63, 64 in FIG. 6, the valve seat will be pressed out of round so as to leave orifices 65, 66 out of contact with the ball, which will create a flow passage between the outlet port and the flow cavity. The flow cavity is always open to the inlet port through the notches.

In both embodiments of the invention, the valve will normally be closed, and may be actuated to be opened by squeezing pressure which may be thought of as a lateral compressive force that can be exerted by pressure from one side, resisted by a responsive pressure on the other side. Similarly, the valve may float around in the body and soft tissue, wherein generally peripheral forces are unlikely to exert sufficient distortive forces to cause unseating of the valve member. Accordingly, this valve is a remotely controllable valve which is normally closed to retain fluids in some part of the human body such as in the bladder of incontinent persons that can be opened by tactile pressure to open the valve for drainage.

This invention is not to be limited by the embodiments shown in the drawings and described in the description, which are given by way of example and not of limitation, but only in accordance with the scope of the appended claims.

I claim:

1. A normally-closed valve which can be opened by lateral compression, comprising: a valve body defining an interior flow cavity, an inlet port and an outlet port opening into said flow cavity through said body, a peripheral valve seat having a central axis and lying normally thereto when the body is undeformed and extending continuously around the outlet port and facing into the flow cavity, the valve body and valve seat being flexible and deformable by lateral compressive force exerted externally on the valve body, and a valving member movably disposed in said flow cavity adapted to make a fluid-tight sealing fit with the valve seat when the valve body is undistorted, and to leave a flow passage between them when the valve body is distorted by lateral compression, said valving member comprising a slack flexible diaphragm extending across the flow cavity, said diaphragm including a central imperforate region adapted to contact the valve seat and close the passage when the valve body is undeformed, said diaphragm having a pair of opposite faces, and a perforation therethrough which lies outside of the said imperforate region and fluidly intercommunicates both of said faces.

2. A valve according to claim 1 in which the valve seat has a continuous valving edge lying in a single plane when the body is undeformed.

3. A valve according to claim 1 in which the diaphragm and the valve seat are formed as an integral member adapted to fit in the flow chamber, with a flexible web interconnecting the valve seat to the diaphragm.

* * * * *

PO-1050
(5/69)

UNITED STATES PATENT OFFICE
CERTIFICATE OF CORRECTION

Patent No. 3,758,073         Dated September 11, 1973

Inventor(s) RUDOLF R. SCHULTE

It is certified that error appears in the above-identified patent and that said Letters Patent are hereby corrected as shown below:

| | |
|---|---|
| Col. 1, line 36 | "there through" should read --therethrough-- |
| Col. 2, lines 5-6 | ", it" should read --.  It-- |
| Col. 2, line 7 | insert a comma after "15" |
| Col. 2, line 39 | "the" should read --then-- |
| Col. 2, line 59 | "affect" should read --effect-- |

Signed and sealed this 17th day of December 1974.

(SEAL)
Attest:

McCOY M. GIBSON JR.
Attesting Officer

C. MARSHALL DANN
Commissioner of Patents